United States Patent
Griesmeier et al.

(10) Patent No.: US 9,909,651 B2
(45) Date of Patent: Mar. 6, 2018

(54) PLANETARY GEAR SYSTEM FOR A HYBRID DRIVE OF A MOTOR VEHICLE

(71) Applicant: ZF Friedrichshafen AG, Friedrichshafen (DE)

(72) Inventors: Uwe Griesmeier, Markdorf (DE); Stefan Beck, Eriskirch (DE); Johannes Kaltenbach, Friedrichshafen (DE)

(73) Assignee: ZF Friedrichshafen AG, Friedrichshafen (AG)

( * ) Notice: Subject to any disclaimer, the term of this patent is extended or adjusted under 35 U.S.C. 154(b) by 362 days.

(21) Appl. No.: 14/436,549

(22) PCT Filed: Sep. 4, 2013

(86) PCT No.: PCT/EP2013/068243
§ 371 (c)(1),
(2) Date: Apr. 17, 2015

(87) PCT Pub. No.: WO2014/060143
PCT Pub. Date: Apr. 24, 2014

(65) Prior Publication Data
US 2015/0330481 A1    Nov. 19, 2015

(30) Foreign Application Priority Data

Oct. 19, 2012 (DE) .................. 10 2012 219 125

(51) Int. Cl.
*F16H 3/72* (2006.01)
*B60K 6/54* (2007.10)
(Continued)

(52) U.S. Cl.
CPC ............ *F16H 3/725* (2013.01); *B60K 6/365* (2013.01); *B60K 6/48* (2013.01); *B60K 6/54* (2013.01);
(Continued)

(58) Field of Classification Search
CPC ...................................................... F16H 3/725
See application file for complete search history.

(56) References Cited

U.S. PATENT DOCUMENTS 6,962,549 B2    11/2005    Dreibholz et al.
8,113,983 B2    2/2012    Gumpoltsberger
(Continued)

FOREIGN PATENT DOCUMENTS

DE    10 2006 056 753 A1    6/2008
DE    10 2009 052 695 A1    5/2011
KR    2011-0131938    12/2011

OTHER PUBLICATIONS

German Search Report, dated Jul. 12, 2013.
PCT Search Report, dated Oct. 30, 2013.

*Primary Examiner* — Derek D Knight
(74) *Attorney, Agent, or Firm* — Dority & Manning, P.A.

(57) ABSTRACT

A planetary transmission for a hybrid drive of a motor vehicle, featuring three coupled planetary gear sets (RS1, RS2, RS3), characterized in that, with a first planetary gear set (RS1), one of the two elements of ring gear (HR1) or planetary carrier (PT1) is connectable to a fixed-housing component (GH) and is connectable or connectable in drive terms to a rotor (RO) of the electric motor (EM), that the other of the two elements of ring gear (HR1) or planetary carrier (PT1) of the first planetary gear set (RS1) is connected to one of the two elements of ring gear (HR3) or planetary carrier (PT3) of a third planetary gear set (RS3), that the sun gear (SR1) of the first planetary gear set (RS1) is connected to a transmission input shaft (GE) and is connectable to one of the two elements of ring gear (HR3) or planetary carrier (PT3) of the third planetary gear set (RS3), and two of the elements of ring gear (HR1), planetary carrier (PT1), sun gear (SR1) of the first planetary gear set (RS1) are connectable to each other, that, with a second planetary gear set (RS2), one of the two elements of ring gear (HR2) or planetary carrier (PT2) is connected or
(Continued)

connected in drive terms to one of the two elements of ring gear (HR3) or planetary carrier (PT3) of the third planetary gear set (RS3), that the other of the two elements of ring gear (HR2) or planetary carrier (PT2) of the second planetary gear set (RS2) is connected in drive terms to a transmission output (GA), that the sun gear (SR2) of the second planetary gear set (RS2) is connected to the rotor (RO) of the electric motor (EM), that two of the elements of ring gear (HR2), planetary carrier (PT2), sun gear (SR2) of the second planetary gear set (RS2) are connectable to each other, and that, with the third planetary gear set (RS3), its sun gear (SR3) is connected or connectable to the fixed-housing component (GH).

14 Claims, 12 Drawing Sheets

(51) Int. Cl.
B60K 6/365 (2007.10)
B60K 6/48 (2007.10)

(52) U.S. Cl.
CPC . *B60Y 2400/421* (2013.01); *F16H 2200/0004* (2013.01); *F16H 2200/0052* (2013.01); *F16H 2200/201* (2013.01); *F16H 2200/2043* (2013.01); *F16H 2200/2064* (2013.01); *F16H 2200/2094* (2013.01); *F16H 2200/2097* (2013.01); *Y02T 10/6221* (2013.01); *Y10S 903/911* (2013.01)

(56) References Cited

U.S. PATENT DOCUMENTS

| | | | |
|---|---|---|---|
| 8,998,762 B2 | 4/2015 | Griesmeier et al. | |
| 2010/0041503 A1 | 2/2010 | Borntraeger | |
| 2012/0178569 A1* | 7/2012 | Grochowski | F16H 3/66 475/5 |
| 2013/0196814 A1* | 8/2013 | Gumpoltsberger | F16H 3/66 475/284 |

\* cited by examiner

| 10_RS1 | -1,50 |
|---|---|
| 10_RS2 | -1,70 |
| 10_RS3 | -2,85 |

Fig.2a

| Gang | B1 | K1 | K2 | K3 | K4 | i | φ |
|---|---|---|---|---|---|---|---|
| M1 | x | | | | x | 5,359 | 1,587 |
| M2 | x | | | x | | 3,377 | 1,799 |
| M3 | | | | x | x | 1,877 | 1,389 |
| M4 | | x | | x | | 1,351 | 1,351 |
| M5 | | | x | x | | 1,000 | 1,217 |
| M6 | | | x | | x | 0,822 | |
| E1 | x | x | | | | 2,450 | 2,450 |
| E2 | | | | x | | 1,000 | |

Fig.2b

PLANETARY GEAR SYSTEM FOR A HYBRID DRIVE OF A MOTOR VEHICLE

FIELD OF THE INVENTION

The invention relates to a planetary transmission for a hybrid drive of a motor vehicle.

BACKGROUND

With drive trains of motor vehicles in parallel hybrid design, with a transmission, an internal combustion engine and an electric motor, the electric motor can be integrated at various locations in the drive train. Typically, in terms of drive technology, an electric motor is installed at the transmission input, which provides additional hybrid functions, such as starting the internal combustion engine, electromotive starting, recuperation and boosting. Another option is to, in terms of drive technology, arrange an electric motor at the transmission output. However, the transmission ratios cannot thereby be used for an electromotive drive. Furthermore, an electric motor may also be arranged within the transmission and integrated into the drive train.

With multi-gear planetary coupling transmissions, which consist of a planetary transmission with multiple interacting planetary gear sets, for the realization of the gears of the transmission, several shifting elements designed as friction clutches and friction brakes are typically present. These are able to shift the planetary transmission under load and without any interruption of the pulling force, However, it is disadvantageous that relatively high drag losses are caused by the rotating components of these frictional shifting elements. Often, an additional starting clutch or a torque converter is required for starting.

From DE 10 2012 212 257 A1 (which has not been published before this), a planetary transmission for a hybrid drive of a motor vehicle is known. With this, the planetary transmission features three coupled planetary gear sets and multiple shifting elements, with which the pulling force of the drive train can be maintained upon a change of gears driven with the internal combustion engine with the assistance of an electric motor. Thus, this transmission does not require any frictional shifting elements subject to drag losses, or synchronizations, in order to maintain pulling force during shifting operations. In terms of drive technology, the electric motor is allocated one transmission shaft or transmission component within the transmission structure. With a first planetary gear set of this transmission, the ring gear is connectable to a fixed-housing component, the planetary carrier is connected in drive terms to the ring gear of a second planetary gear set, and the sun gear is connected to the fixed-housing component. With the second planetary gear set, the planetary carrier is connected to the ring gear of a third planetary gear set, and the sun gear is coupled with a transmission input shaft. With the third planetary gear set, the planetary carrier is connected to a transmission output shaft, and the sun gear is connectable to the fixed-housing component and is connected to the ring gear of the first planetary gear set. The shifting elements of this transmission arrangement may be formed as simple positive-locking shifting claws, since the electric motor functions as a power-shifting element. The electric motor also provides the usual hybrid functions, including a starting function. For the realization of five forward gears, this transmission arrangement features three positive-locking shifting clutches and one positive-locking shifting brake. The internal combustion engine, the electric motor and the planetary gear sets are in a coaxial arrangement, whereas, in order to achieve a particularly compact structural shape, the planetary gear sets and the shifting elements may be installed at least partially in a radial internal installation space of the electric motor.

From DE 10 2007 005 438 A1, a planetary transmission with multiple planetary gear sets and multiple shifting elements for a hybrid drive of a motor vehicle are known; with this, an electric motor is in operative connection with one of the planetary gear sets, in order to support a torque applying at the planetary gear set for the realization of a transmission ratio. An internal combustion engine, an electric drive with at least one electric motor installed in the transmission along with the planetary gear sets are in a coaxial arrangement. With a fixed-housing component, the rotor of the electric motor is connected to the ring gear of the relevant planetary gear set and the stator. The ring gear is connectable to the fixed-housing component through a positive-locking shifting element. The shifting elements are formed as friction clutches and friction brakes, or as claw clutches and claw brakes, which can be actuated by means of an assigned actuator system, for example electromotively. With a corresponding controlling of the actuators of the relevant shifting elements, shifts can be carried out with the assistance of the electric motor, without any interruption of the pulling force, whereas the respective shifting elements are synchronized by the electric motor. Upon a shifting operation, the electric motor replaces the function of a frictional-locking power-shifting element, whereas its torque is led to a transmission output shaft connectable to the output of the hybrid drive train. Hybrid functions that are known, such as electric starting, recuperation and boosting, are also possible with this drive train. With three planetary gear sets and four shifting elements, two of which are formed as shifting clutches and two are formed as shifting brakes, with this transmission, a total of six forward gears and one reverse gear are usable.

SUMMARY OF THE INVENTION

Against this backdrop, the invention is subject to a task of creating a planetary transmission with coupled planetary gear sets for a hybrid drive of a motor vehicle, which is at least mostly able to be shifted without any interruption of the pulling force, and thereby features a compact structural shape and is cost-effective in production and efficient in operation.

The solution of this task arises from the characteristics of the planetary transmission as described and claimed herein.

The invention is based on the finding that, with a hybrid drive with a planetary coupling transmission, an electric motor can be integrated and controlled in such a manner that, with a shifting operation operated with an internal combustion engine, shifting clutches or shifting brakes to be actuated can be engaged or disengaged load-free without any interruption of the pulling force of the drive train, such that omitting the frictional shifting elements or synchronizations is possible. With three coupled planetary gear sets, the elements of which, through permanent or shiftable connections, operate in conjunction in a suitable manner with an electric motor implemented in such a manner and an internal combustion engine, along with each other, it is possible to achieve the performance and functions of a conventional drive train with at least six gears, with a lower expenditure of costs and installation space. To the extent that the connection of the coupled planetary gear sets remains, arrangements are also possible where the electric motor is not spatially integrated into the transmission, but is functionally connected to it in the same manner. This can enable a transmission arrangement that is adjustable to the present installation space conditions with relative ease.

Accordingly, the invention relates to a planetary transmission for a hybrid drive of a motor vehicle, with an internal combustion engine and an electric motor, featuring three coupled planetary gear sets, each with a ring gear, a sun gear and a planetary carrier guiding several planets, and with several shifting elements for the realization of several gears driven by an internal combustion engine and/or an electric motor.

For the solution of the task that is stated, the invention provides that, with a first planetary gear set, one of the two elements of ring gear or planetary carrier is connectable to a fixed-housing component and is connectable or connectable in drive terms to a rotor of the electric motor, that the other of the two elements of ring gear or planetary carrier of the first planetary gear set is connected to one of the two elements of ring gear or planetary carrier of a third planetary gear set, that the sun gear of the first planetary gear set is connected to a transmission input shaft and is connectable to one of the two elements of ring gear or planetary carrier of the third planetary gear set, and two of the elements of ring gear, planetary carrier, sun gear of the first planetary gear set are connectable to each other, that, with a second planetary gear set, one of the two elements of ring gear or planetary carrier is connected or connected in drive terms to one of the two elements of ring gear or planetary carrier of the third planetary gear set, that the other of the two elements of ring gear or planetary carrier of the second planetary gear set is connected in drive terms to a transmission output, that the sun gear of the second planetary gear set is connected to the rotor of the electric motor, that two of the elements of ring gear, planetary carrier, sun gear of the second planetary gear set are connectable to each other, and that, with the third planetary gear set, its sun gear is connected or connectable to the fixed-housing component.

With the selected definitions, under the term "connection," a direct or indirect torque-proof connection is understood. With the term "drive connection," a force-fitting connection through a means of transfer, such as a pair of spur gears or the like, is understood.

Through the described arrangement, a planetary transmission for a hybrid drive train is created, with which the electric motor is able to maintain pulling force during all shifts of the transmission, for which the internal combustion engine serves as a drive unit. The transmission does not require any frictional shifting elements or synchronizations. All shifting elements can be formed as cost-effective shifting claws. Thus, the transmission structure is possible with relatively low expenditures for costs and construction.

With this planetary transmission, the operating rotational speeds and shifting torques of the individual components are relatively low. In addition, the gearing efficiency is high and the drag torques are low. Thereby, this planetary transmission achieves a high degree of efficiency.

Generally, one or more of the planetary gear sets may be realized as negative transmissions, thus with negative stationary transmission ratios, which is provided by the transmission ratio relationship of two gear set elements with a planetary carrier that is held down, and also as positive transmissions, thus with positive stationary transmission ratios. Upon the conversion between the construction methods of negative transmissions and positive transmissions, only the coupling of the planetary gear sets according to the invention must be possible, whereas each connection of the planetary carrier and the ring gear are exchanged, and the stationary transmission ratio of the respective planetary gear set is increased or decreased by the value of 1.

Preferably, the planetary gear sets are formed as negative gear sets, with which the stationary transmission ratio with a planetary carrier that is held down is negative, based on the usual sign convention for the ring gear. Compared to a positive transmission, the construction method of the negative transmission is often structurally simple and may feature a better degree of efficiency.

With a design as a negative transmission, it can be provided that, with a first planetary gear set, the ring gear is connectable to a fixed-housing component and is connectable or connectable in drive terms to a rotor of the electric motor, the planetary carrier is connected to the ring gear of a third planetary gear set, the sun gear is connected to a transmission input shaft and/or the drive shaft of the internal combustion engine and is connectable to the planetary carrier of the third planetary gear set, and two of the elements of ring gear, planetary carrier, sun gear of the first planetary gear set are connectable to each other, that, with a second planetary gear set, the ring gear is connected or connected in drive terms to the planetary carrier of the third planetary gear set, the planetary carrier is connected in drive terms to a transmission output, the sun gear is connected to the rotor of the electric motor, and two of the elements of ring gear, planetary carrier, sun gear of the second planetary gear set are connectable to each other, and that, with the third planetary gear set, the sun gear is connected or connectable to the fixed-housing component.

The arrangement of the transmission elements in accordance with the invention enables a shift diagram with a progressive gear gradation, whereas the stationary transmission ratios are largely freely selectable. With such a gear gradation, for which the consecutive progressive steps, in contrast to a geometric gear gradation, vary with steps that tend to be smaller, by which the difference of maximum speeds between the gears is nearly constant, comparatively fewer gears are required in order to realize a defined overall spread of the transmission.

The internal combustion engine, the electric motor and the three planetary gear sets may form a coaxial arrangement. Thereby, the arrangement order of the individual planetary gear sets, spur gear stages and shifting elements, along with the input and output, are generally freely selectable, to the extent that the fixed and shiftable connections and/or drive connections in accordance with the method of the invention are maintained. Thereby, the transmission arrangement is adjustable to the installation space requirements with relative ease. With this arrangement, the electric motor may be integrated into the transmission and arranged completely within a transmission housing, resulting in a particularly compact structural shape.

However, it is also possible that the internal combustion engine and the electric motor are arranged in an axially parallel manner, whereas the first planetary gear set and the third planetary gear set are arranged coaxial to the internal combustion engine and the second planetary gear set is arranged coaxial to the electric motor, whereas the drive connection between one of the two elements of ring gear or planetary carrier of the first planetary gear set and the electric motor is realized through one or more spur gear stages. Thereby, a transmission arrangement that is particularly compact in axial terms is realized. With this arrangement, the electric motor may be upstream, for example, to its allocated planetary gear set.

With both embodiments, depending on the available installation space and the desired transmission ratio, the drive connection between the second planetary gear set and the transmission output may be realized through one or more spur gear stages. For example, with the coaxial arrangement, all three planetary gear sets and the two drive units may provide a two-stage transmission ratio through coupled pairs of spur gears for a power transmission to a differential transmission. With an axially parallel arrangement of the internal combustion engine and the electric motor, for example, a simple spur gear stage to the differential transmission may be sufficient. As an alternative to spur gear stages, chain drives or other vehicle drives are also suitable for the transmission of power.

In addition, at each of the transmission shafts of the planetary transmission, a freewheel may be arranged opposite to a different shaft or a transmission housing, to the extent that this is useful for the functioning of the transmission.

Furthermore, the usual hybrid functions of parallel hybrid drives, such as recuperation and boosting, are available. With the assistance of the electric motor, with the proposed transmission structure, a start-up procedure may be particularly carried out, with which no additional starting clutch or torque converter is required, which also has the effect of saving costs and installation space.

In accordance with a preferred embodiment of the invention, the described arrangement with three planetary gear sets enables at least six shifting forward gears without any interruption of the pulling force, which can be shifted through five unsynchronized shifting elements, whereas four of the shifting elements are formed as positive-locking shifting clutches and one of the shifting elements is formed as a positive-locking shifting brake.

The first and the second planetary gear set may be blocked by locking one or more of the shifting elements in themselves, in order to, for the realization of a specified shifting sequence and a specified gear gradation, rotate with a direct transmission ratio. This blocking may be realized by various pairings of gear set elements with each other. For this purpose, it may be provided that, with the first planetary gear set and/or with the second planetary gear set, the corresponding planetary carrier is connectable to the corresponding sun gear. With an alternative arrangement of the relevant shifting element(s), with the first planetary gear set and/or with the second planetary gear set, the corresponding ring gear may be connected to the corresponding sun gear. With a different alternative arrangement of the relevant shifting element(s), with the first planetary gear set and/or with the second planetary gear set, the corresponding ring gear may be connectable to the corresponding planetary carrier.

Furthermore, the presented transmission arrangement enables at least two gears driven by an electric motor, whereas one of the gears driven by an electric motor may feature a short transmission ratio (thus a transmission ratio that is slowly transferred), and the other of the two gears driven by an electric motor may be formed as a direct gear. The gear with the short transmission ratio may also be used as a reverse gear driven by an electric motor.

However, without any further action, a change from the short gear driven by the electric motor is associated with an interruption of the pulling force. In order to nevertheless enable a traction upshift or traction downshift from this gear that maintains pulling force, a shifting element may be formed as a frictional shifting element that unburdens the relevant positive-locking shifting elements, such that these can be shifted load-free, without interrupting the pulling force in the drive train. With a preferable shift diagram of the transmission, this can be put into concrete terms by the fact that such shifting element that is present for the establishment of a connection between two of the elements of ring gear, planetary carrier or sun gear of the second planetary gear set, thus for the blocking of the second planetary gear set, is formed as a frictional shifting element, in order to also act as a power-shifting element or a start-up element.

Furthermore, it can be provided that the planetary transmission is able to be brought into a shifting position for the charging of an electrical energy storage device by means of the electric motor with a stationary or rolling vehicle. When the vehicle is at a standstill, the transmission output may be locked by an additional brake or a parking brake that usually already exists, and the internal combustion engine may be coupled with the electric motor, whereas the electric motor is operated as a generator, in order to (for example) charge the connected vehicle battery of the vehicle electrical system.

When the vehicle is rolling, this function is also able to be realized by detachably connecting the sun gear of the third gear set, which is actually constantly connected to the housing, to the transmission housing through an additional shifting element. By detaching the sun gear of the third gear set from the transmission housing, this may turn freely, such that the vehicle may roll without a drive, while the internal combustion engine is coupled with the electric motor and drives it in generator mode.

If, for the power shifting specified above from the short gear driven by an electric motor, the shifting element present for the blocking of the second planetary gear set is formed as a frictional shifting element, with the assistance of such frictional shifting element, through a slip control, there can be a direct change from charging while at a standstill or rolling in driving mode.

BRIEF DESCRIPTION OF THE DRAWINGS

To illustrate the invention, the description of a drawing of one embodiment is attached. The following is shown in it:

FIG. 2a is a transmission ratio table with stationary transmission ratios of planetary gear sets of the transmission in accordance with FIG. 1, FIG. 2b is a shifting table for the transmission in accordance with FIG. 1.

Figure 1:
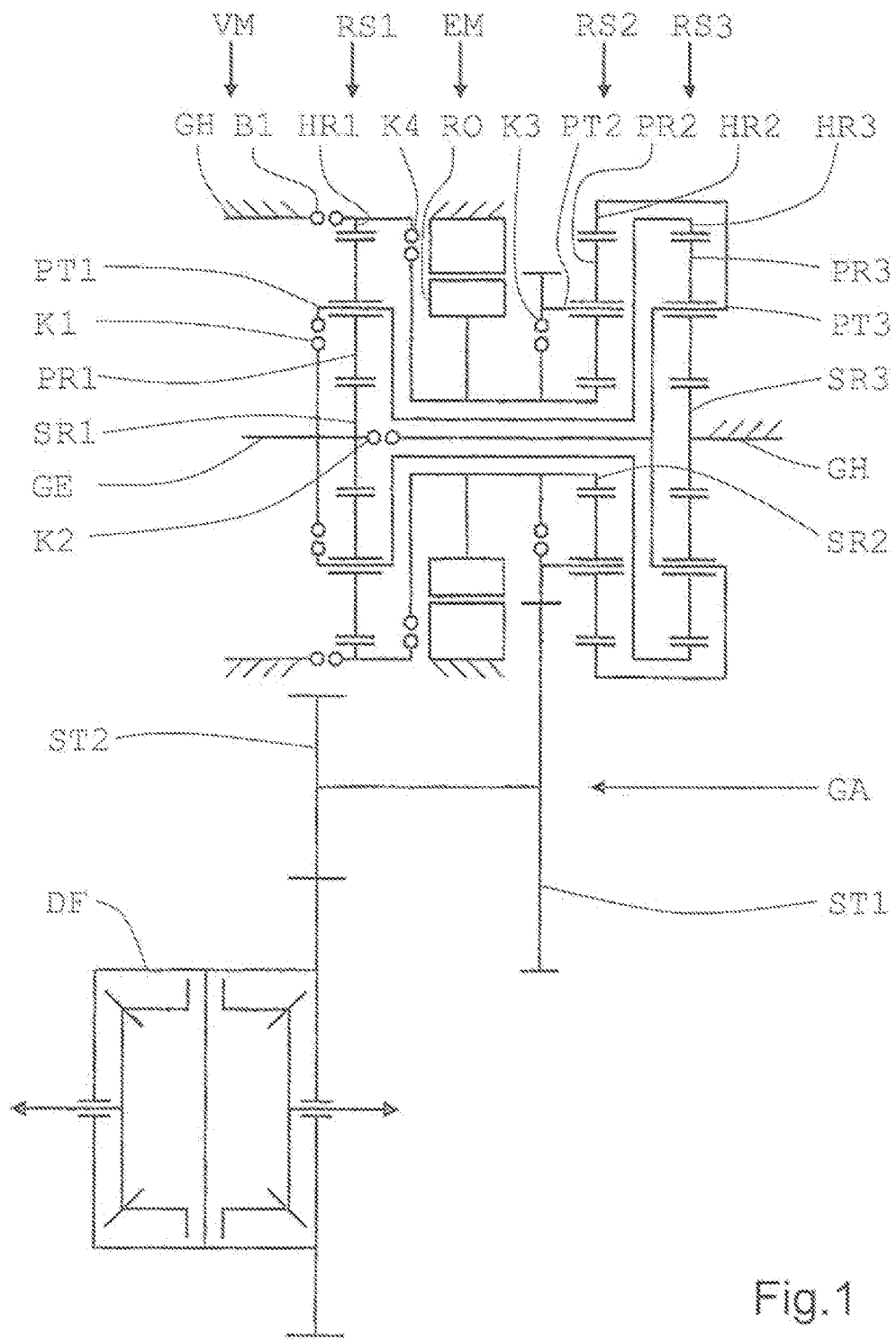
FIG. 1 is a transmission scheme of a planetary transmission with three planetary gear sets, which operates in conjunction with an internal combustion engine and an electric motor.
Figure 3:
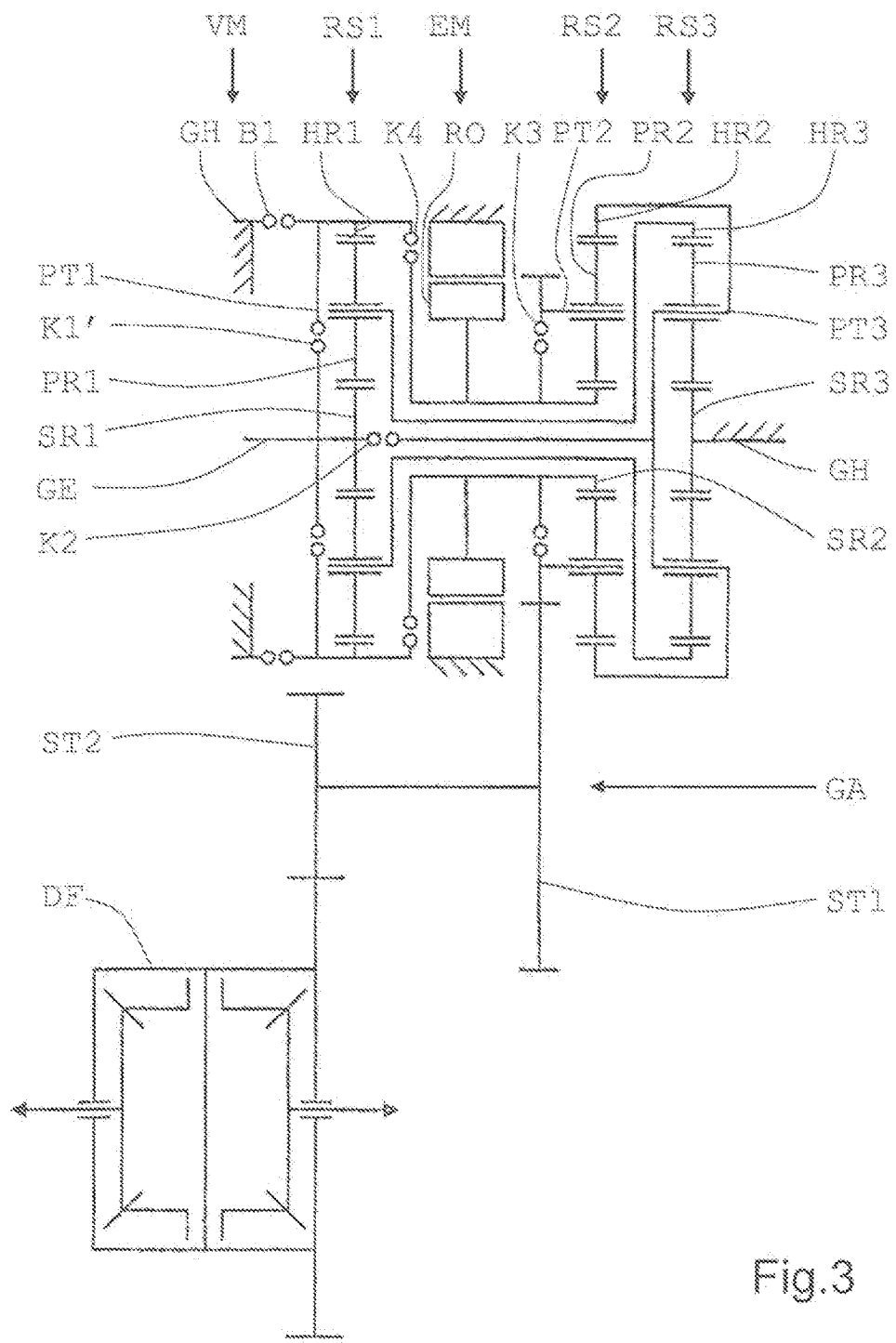
FIG. 3 is the transmission scheme of FIG. 1 with an alternative arrangement of the shifting elements for the blocking of a first planetary gear set.

For the purpose of simplification, with the exception of shifting clutches that are arranged differently in alternative arrangements of the shifting elements of a transmission arrangement, components that have the same function or effect have the same reference signs in the figures.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Accordingly, FIG. 1 presents a planetary transmission of a hybrid drive train of a motor vehicle, which features three simple planetary gear sets in RS1, RS2, RS3 in negative transmission design. The three planetary gear sets RS1, RS2, RS3, also designated in shortened form as gear sets, in each case consist of a ring gear HR1, HR2 HR3, a sun gear SR1, SR2, SR3 and a planetary carrier PT1, PT2, PT3, each of which guides several planetary gears PR1, PR2, PR3, also designated in shortened form as planets.

The planetary transmission is able to be operated by an internal combustion engine VM upstream to it or by an electric motor EM integration into the transmission arrangement. The three planetary gear sets RS1, RS2, RS3, the internal combustion engine VM and the electric motor EM are in a coaxial arrangement, whereas the electric motor EM is positioned axially between the first planetary gear set RS1 and the second planetary gear set RS2. The power transmission to a differential transmission DF takes place in the transmission output GA through a two-stage transmission ratio with allocated pairs of spur gears ST1 and ST2, which are arranged on a common shaft.

For the realization of six forward gears M1 to M6 driven by an internal combustion engine along with two forward gears E1, E2 driven by an electric motor, five unsynchronized shifting elements B1, K1, K2, K3, K4, formed as shifting claws, are arranged, whereas one of the shifting elements is formed as a shifting brake B1, and the other shifting elements are designed as shifting clutches K1, K2, K3, K4. With this transmission, one or more reverse gears also can be realized, but are not more specifically described herein.

For further simplification, the forward gears driven by an internal combustion engine are also designated in abbreviated form as mechanical gears M1, M2, M3, M4, M5, M6, and the forward gears driven by an electric motor are also designated in abbreviated form as electrical gears E1, E2.

The various connections of the individual elements of the gear sets of the planetary transmission are, to the extent useful, realized through shaft sections that are shown in FIG. 1 but not further described. Accordingly, the planetary coupling transmission is presented in detail as follows:

With the first planetary gear set RS1, the ring gear HR1 is connectable to a fixed-housing component GH by means of a brake B1 and a rotor RO of the electric motor EM by means of a fourth clutch K4. The planetary carrier PT1 is connected to the ring gear HR3 of a third planetary gear set RS 3. The sun gear SR1 is connected to a drive shaft of the internal combustion engine VM or a transmission input shaft GE, and is connectable to the planetary carrier PT3 of the third planetary gear set RS3 by means of a second clutch K2. In order to block the gear set RS1, its planetary carrier PT1 can be coupled with its sun gear SR1 by means of a first clutch K1.

With a second planetary gear set RS2, the ring gear HR2 is connected to the planetary carrier PT3 of the third planetary gear set RS3. The sun gear SR2 is connected to the rotor RO of the electric motor EM, and the planetary carrier PT2 is connected to a first spur gear stage ST1 of the transmission output GA.

As indicated, the transmission output GA comprises a first pair of spur gears ST1 and a second pair of spur gears ST2, whereas the drive gear of the second pair of spur gears ST2 is connected in a torque-proof manner to the output gear of the first pair of spur gears ST1 through a shaft connection. The output gear of the second pair of spur gears ST2 meshes with the differential transmission DF, through which a vehicle axle can be driven with vehicle wheels. In order to block the second planetary gear set RS2, its planetary carrier PT2 is connectable to its sun gear SR2 by means of a third clutch K3. With the third planetary gear set RS3, the sun gear SR 3 is connected to the fixed-housing component GH.

FIG. 2a shows an example of the possible stationary transmission ratios of the three gear sets RS1, RS2, RS3. According to the sign convention for negative transmissions, the stationary transmission ratios of gear sets RS1, RS2, RS3 formed as a negative transmission are provided with negative signs. Accordingly, the first gear set RS1 features a stationary transmission ratio of −1.50, the second gear set RS2 features a stationary transmission ratio of −1.70 and the third gear set RS3 features a stationary transmission ratio of −2.85, thus a substantially larger stationary transmission ratio than the other two gear sets RS1, RS2.

FIG. 2b shows a corresponding exemplary shift diagram of the planetary gear of FIG. 1. It can be seen from this that, with the six mechanical forward gears M1, M2, M3, M4, M5, M6, two of the shifting elements B1, K1, K2; K3, K4 are locked in each case. The transmission ratios i of the gears and the associated progressive steps φ that arise from this can also be derived from the table. Accordingly, the fifth gear M5 is designed as a direct gear, and the sixth gear M6 is designed as a fast gear. The progressive steps 9 give rise to an essentially progressive transmission gradation, thus a gradation with increasingly smaller steps in the direction from the smaller gears to the larger gears. Thereby, the six mechanical gears M1 to M6 can be shifted with the assistance of the electric motor EM without any interruption of the pulling force.

Furthermore, a first electrical gear E1 with a short transmission ratio, thus a slow transmission ratio, and a second electrical gear E2 with a direct transmission ratio, are available. Upon a change of direction of rotation of the electric motor EM, the gear E1, driven electrically, may also be used as a reverse gear.

The functioning of the planetary transmission of FIG. 1 is described as follows:

With a start-up procedure driven by an electric motor, the shifting brake B1 and thus the ring gear HR1 of the first planetary gear set RS1 on the side of the internal combustion engine is located at the housing GH. The electric motor EM drives the sun gear SR2 of the second planetary gear set RS2, and the third shifting clutch K3 is open. Since the first clutch K1 is locked, the first planetary gear set RS1 is located as a whole at the housing GH. Thereby, the planetary carrier PT1 along with the ring gear HR3 of the third planetary gear set RS3 is at a standstill. Since the sun gear SR3 of the third planetary gear set RS3 is set at the housing GH, this third planetary gear set RS3, with its planetary carrier PT3, is also at a standstill in this operating mode. Thereby, the planetary gears PR2 of the second planetary gear set RS2 driven by the sun gear SR2 can be supported at the ring gear HR2 of the second planetary gear set RS2 connected to the planetary carrier PT3 of the third planetary gear set RS3, and can be driven through the planetary carrier PT2 of the second planetary gear set RS2 connected to the input-side gear wheel of the first pair of spur gears ST1 to the output GA. Thereby, the electric motor EM acts as an electrodynamic start-up element (EDA).

From the start-up driven by the electric motor, a change to the first or second mechanically driven gear M1, M2 is possible. Thereby, the shifting brake B1 is locked, the first shifting clutch K1 is open and the fourth or the third shifting clutch K4, K3 is locked. Upon this change in gears, the pulling force can be maintained, since, with a corresponding rotational speed of the electric motor EM, the relevant shifting element K4, K3 is synchronous and can be locked without load.

The mechanical gears M1 to M6 can be shifted without any interruption of the pulling force, whereas the electric motor EM supports the respective gear change through a corresponding torque in the drive train or at the transmission output GA, such that, in each case, the shifting elements B1, K1, K2, K3, K4 to be actuated can be engaged or disengaged without load. Thereby, at the internal combustion engine VM, the rotational speed of the engine is adjusted to the new gear by means of a suitable control.

In a fifth mechanical gear M5, a direct connection between the drive shaft GE of the internal combustion engine VM and the planetary carrier PT3 of the third planetary gear set RS3 is produced by the locking of the second shifting element K2. Since, at the same time, the second planetary gear set RS2 is blocked by a locked third shifting element K3 and the sun gear SR3 of the third planetary gear set RS3 is firmly connected to the housing GH, a direct transmission ratio driven by the internal combustion engine arises at the output GA. The highest gear M6 is designed as a fast gear. As can be derived from the shift diagram in accordance with FIG. 2b and FIG. 1, the rotor of the electric motor EM is driven in the mechanical gears M2 to M5. This can be used in order to drive the electric motor EM in driving mode with one of the gears M2 to M5, such that it can feed electricity into the vehicle electrical system in generator mode.

In order to shift the first electrical gear E1, the shifting brake B1 along with the first shifting clutch K1 are closed; thus the first planetary gear set RS1 and, at the same time, the third planetary gear set RS3, are located at the housing. This results in the relatively large transmission ratio of this first electric gear E1. If all shifting elements are formed as positive-locking clutches and brakes, the first gear driven by the electric motor can be shifted in a manner that interrupts the pulling force. However, if the third shifting clutch K3, thus the shifting clutch for the blocking of the second planetary gear set RS2, is formed as a frictional shifting element, then, from the first electrical gear E1, a power shifting that maintains pulling force can be carried out for a traction upshift or traction downshift. Thereby, the claw shifting elements to be shifted can be unburdened by a control of the frictional shifting element K3, and can be opened without load.

During such a traction upshift, it is only possible to open the shifting brake B1 and keep the first shifting clutch K1 locked. Upon the locking of the friction clutch K3, this leads to a traction upshift with a simultaneous engine start in the fourth gear M4 of the drive provided by the internal combustion engine. Thereby, the torque of the electric motor EM is to accordingly increase, in order to also generate the drag torque of the internal combustion engine VM to be overcome. In such a case, the electric motor EM transmits its torque, on the one hand, through the frictional shifting element K3, at the output and, on the other hand, through the ring gear HR2 of the second planetary gear set RS2 and the planetary carrier-ring gear-transmission ratio PT3/HR3 of the third planetary gear set RS3 at the drive shaft GE of the internal combustion engine VM.

For a further description of carrying out shifting operations with an automatic transmission that features both frictional-locking shifting elements and positive-locking shifting elements, reference is also made at this place to DE 102 44 023 A1 of the applicant.

In order to shift to the second electrical gear E2, only the third shifting clutch K3 is locked; thus, the second planetary gear set RS2 is blocked. In this gear, all other shifting elements are open. This results in a direct transmission ratio driven by the electric motor at the transmission output GA. Since the torque of the electric motor EM in this gear is transferred directly, thus without the interposition of gear wheels, to the transmission output GA, the transmission of power takes place up to the first spur gear stage ST1 without any gearing loss.

From a trip driven by the electric motor in this gear E2, with a previously started internal combustion engine VM, there can be a change in the driving mode driven by the internal combustion engine. Depending on the current speed, a change in the relevant mechanical gears M2, M3, M4 and M5 is possible solely by locking one of the shifting elements B1, K4, K1, K2.

A charging function for charging an electrical energy storage device in the vehicle electrical system when the vehicle is at a standstill can be realized by shifting an electrodynamic start-up function. For this purpose, the transmission output GA is locked, for example by means of a parking brake of the vehicle taking effect on the wheels of the vehicle. In addition, the first shifting element K1 is locked, by which the first planetary gear set RS1 is blocked in itself, and the ring gear HR3 of the third planetary gear set RS3 rotates with the rotational speed of the first planetary gear set RS1 or the transmission input shaft GE. By the fact that the sun gear SR3 of the third planetary gear set RS3 is at a standstill in a manner fixed to the housing, the ring gear HR3 of the third planetary gear set RS3 drives the planetary gears PT3 of the third planetary gear set RS3, by which its planetary carrier PT3 is also put into rotation. Since the planetary carrier PT3 of the third planetary gear set RS3 is connected in a torque-proof manner to the ring gear HR2 of the second planetary gear set RS2, this drives the sun gear SR2 of the second planetary gear set RS2 through its planetary gears PL2 to the ring gear HR2 of the second planetary gear set RS2 when the planetary carrier PT2 of the second planetary gear set RS2 is braked. This sun gear SR2 is connected to the rotor of the electric motor EM, such that, in this manner, the electric motor EM is able to operate in generator mode even when the vehicle is stopped.

For the power flow through the third planetary gear set RS3 in driving mode, the sun gear SR3 of the third planetary gear set RS3 connected to the housing GH acts as a supporting element. If this sun gear SR3 is detachably connectable to the housing GH through an additional shifting element that is not shown, the electrical charging function may be carried out even with a rolling vehicle. For this purpose, the sun gear SR3 is detached, such that it can rotate freely, and the internal combustion engine VM is coupled to the electric motor EM in terms of drive technology by locking two shifting elements K1 and K4. With a locked first shifting element K1, the first planetary gear set RS1 is blocked in itself, and is connected with effectiveness for the drive to the sun gear SR2 of the second planetary gear set RS2 through the locked fourth shifting element K4. Since, with a freely rotating sun gear SR4 of the third planetary gear set RS3, a transfer of torque is not supported in this, this third planetary gear set RS3 rotates only loosely, and the drive of the rotor of the electric motor EM takes place through a torque-proof connection to the sun gear SR2 of the second planetary gear set RS2 or through a torque-proof connection between a sun gear shaft and the rotor of the electric motor EM. Since, in these operating conditions, the third shifting element K3 is also open, when the vehicle is at a standstill or even when it is rolling, the electric motor EM can be driven by the internal combustion engine VM for generator operation.

From charging operation, start-up or continued travel is directly possible, if the third shifting clutch K3 for the blocking of the second planetary gear set RS2 is formed as a frictional shifting element, and is accordingly controlled.

FIGS. 3 to 6 show alternatives for blocking, with the same effect, of the first and second planetary gear sets RS1, RS2 of the transmission arrangement in accordance with FIG. 1.

Figure 4:
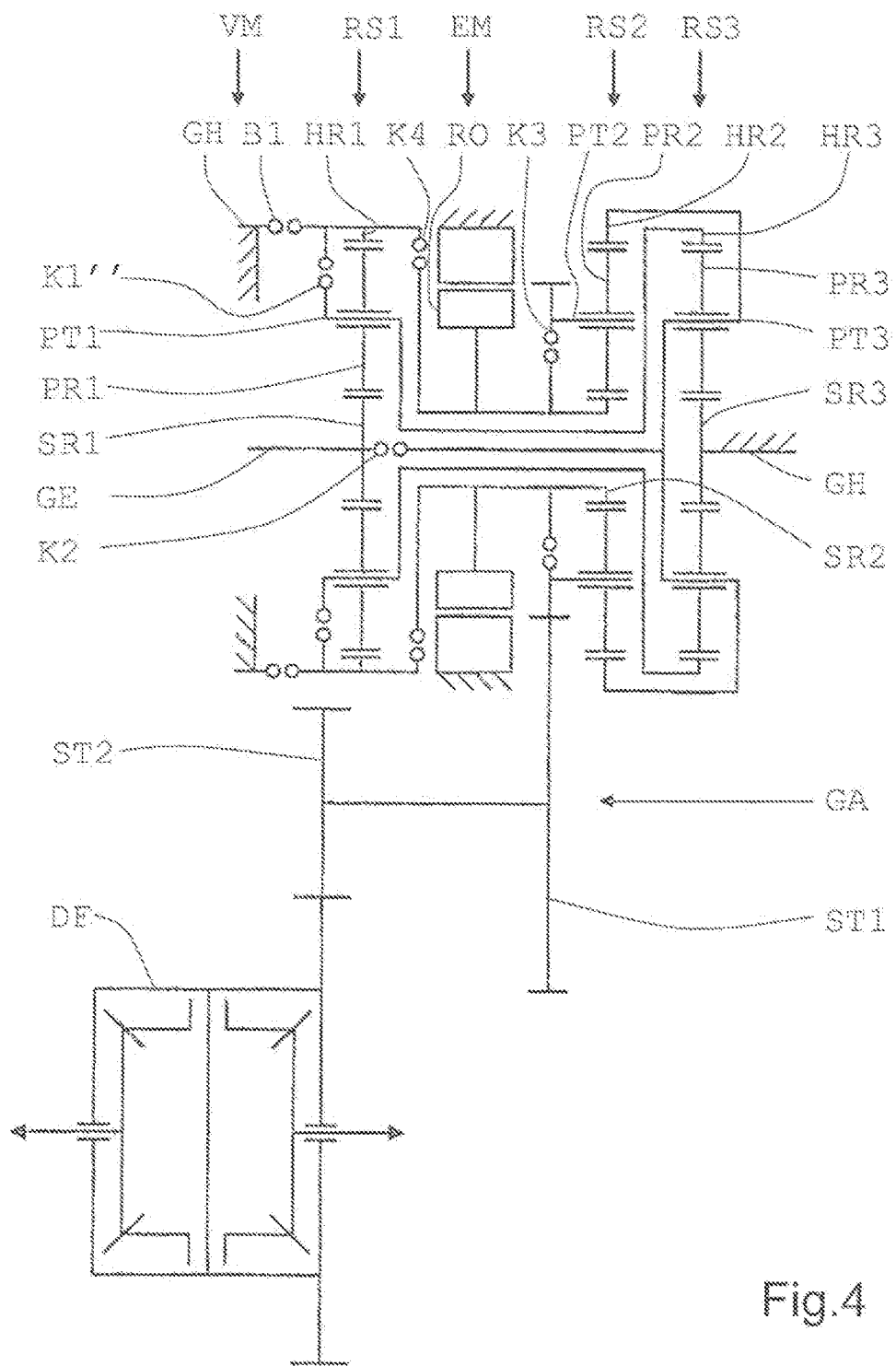
FIG. 4 is the transmission scheme of FIG. 1 with a different alternative arrangement of the shifting elements for the blocking of the first planetary gear set.

The first planetary gear set RS1 of FIG. 1 can be blocked in itself by locking the shifting clutch K1. Thereby, its planetary carrier PT1 and sun gear SR1 are coupled with each other in a torque-proof manner, such that all components of the planetary gear set rotate with the same rotational speed upon driving. With the embodiment in accordance with FIG. 3, the shifting clutch K1 of the first planetary gear set RS1 in accordance with FIG. 1 is replaced by a shifting clutch K1'. Thereby, with the first planetary gear set RS1, the ring gear HR1 can be coupled with the sun gear SR1, and, in this manner, the first planetary gear set RS1 can be blocked in itself. FIG. 4 shows as an additional alternative to this, with which, in the first planetary gear set RS1, a shifting clutch K1" is present for a coupling of the ring gear HR1 with the planetary carrier PT1, through the locking of which the first planetary gear set RS1 can be blocked in itself.

Figure 5:
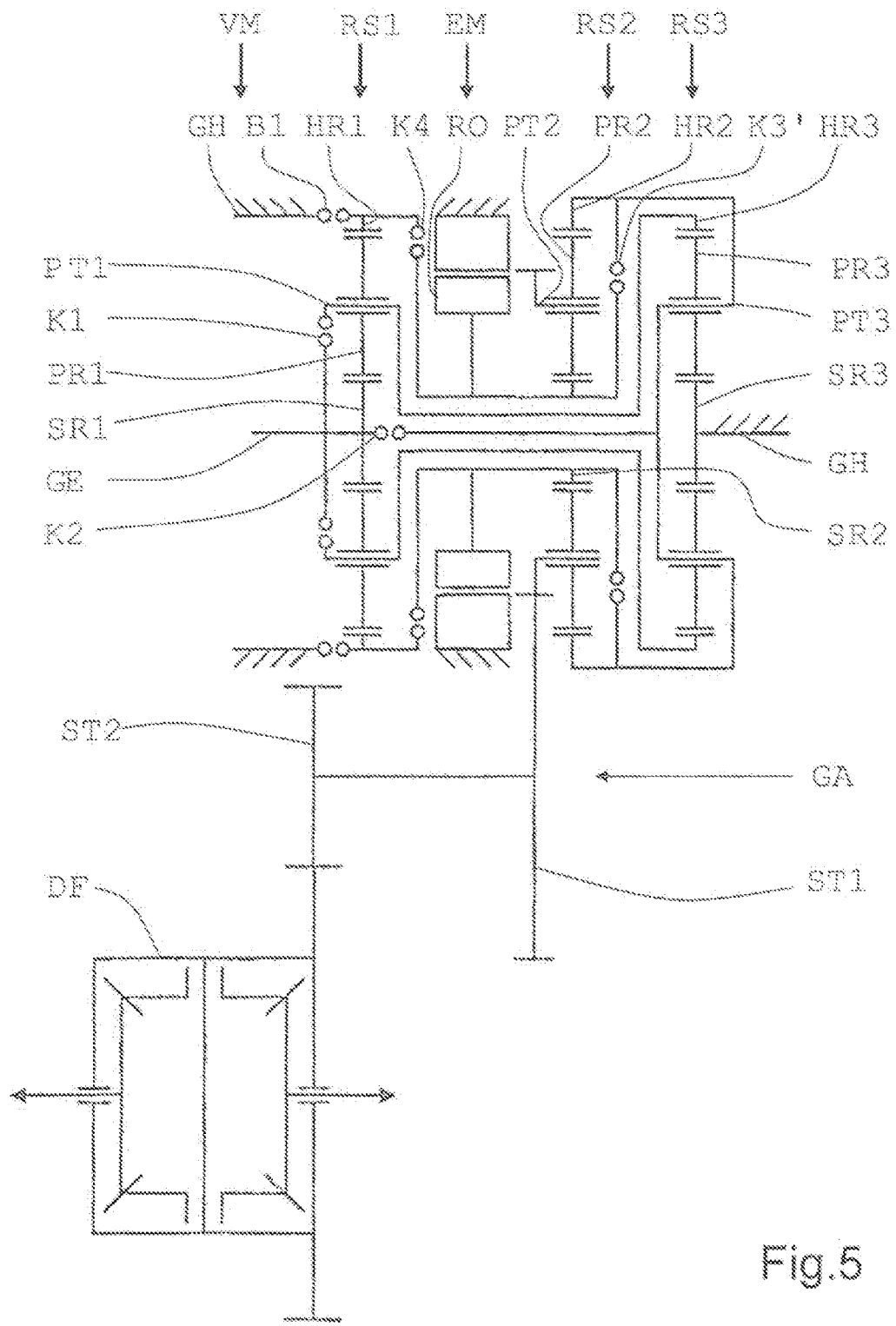
FIG. 5 is the transmission scheme of FIG. 1 with an alternative arrangement of the shifting elements for the blocking of a second planetary gear set.
Figure 6:
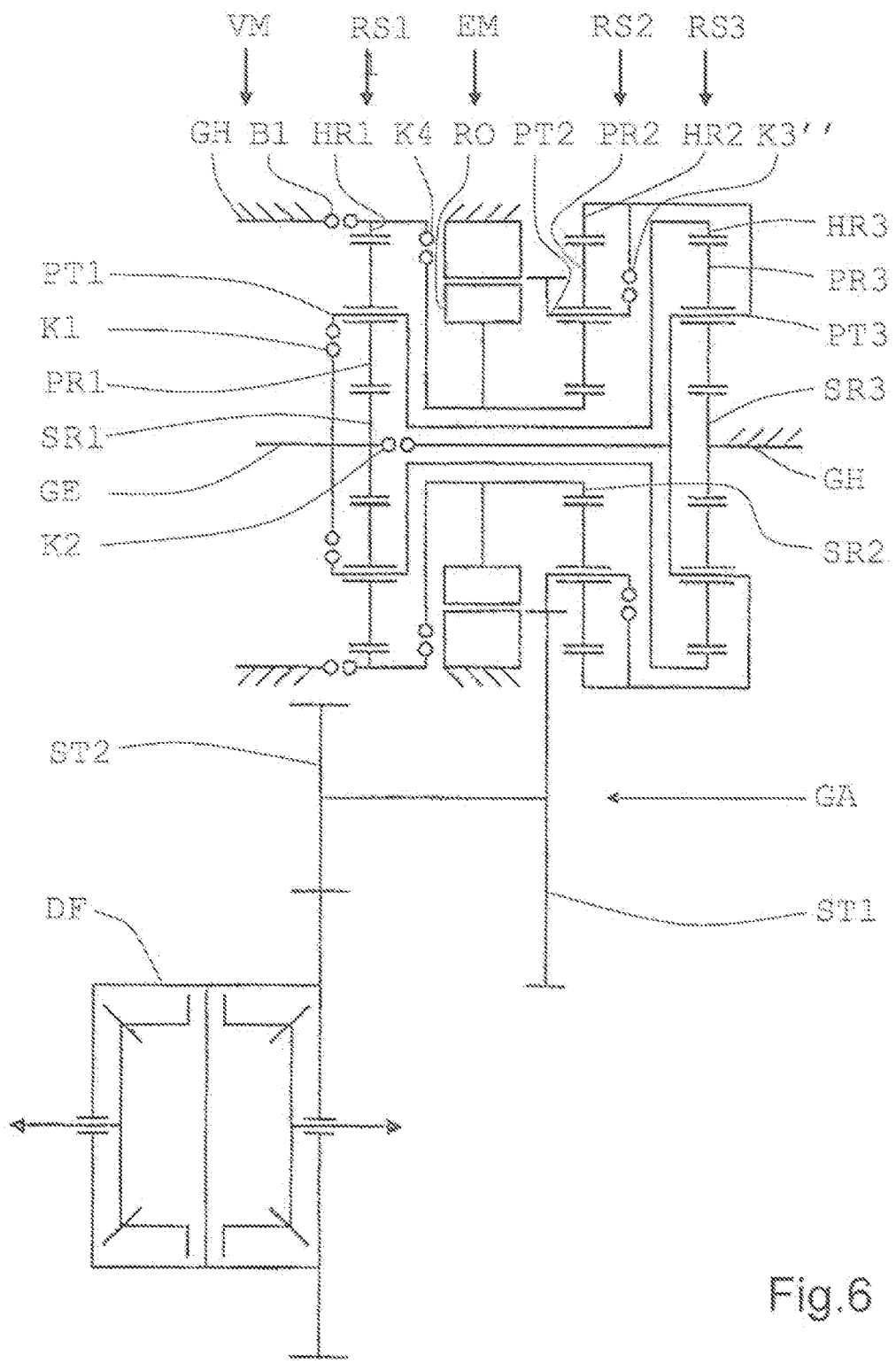
FIG. 6 is the transmission scheme of FIG. 1 with a different alternative arrangement of the shifting elements for the blocking of the second planetary gear set.

The second planetary gear set RS2 of FIG. 1 can be blocked in itself by locking the shifting clutch K3. For this purpose, its planetary carrier PT2 and sun gear SR2 are coupled with each other in a torque-proof manner. In FIG. 5, the shifting clutch K3 of the second planetary gear set RS2 in accordance with FIG. 1 is replaced by the shifting clutch K3'. Thereby, with the second gear set RS2, its ring gear HR2 can be coupled with its sun gear SR2. FIG. 6 shows, as an additional alternative, a shifting clutch K3" of the second planetary gear set RS2 for a torque-proof coupling of its ring gear HR2 with its planetary carrier PT2.

Combinations of the alternative shifting element arrangements for blocking shown in FIGS. 1 to 6 are also possible.

Furthermore, other shifting elements B1, K1, K2, K3, K4 can be arranged at positions other than those previously shown in the transmission structure in accordance with the invention. For example, with the transmission arrangement in accordance with FIG. 3, it is possible to move the second shifting element K2 near the side of the fixed-housing component GH to the right in FIG. 3, by forming the planetary carrier PT3 of the third planetary gear set RS3 radially on the inside as a hollow shaft and extending the transmission input shaft GE through this.

Figure 7:
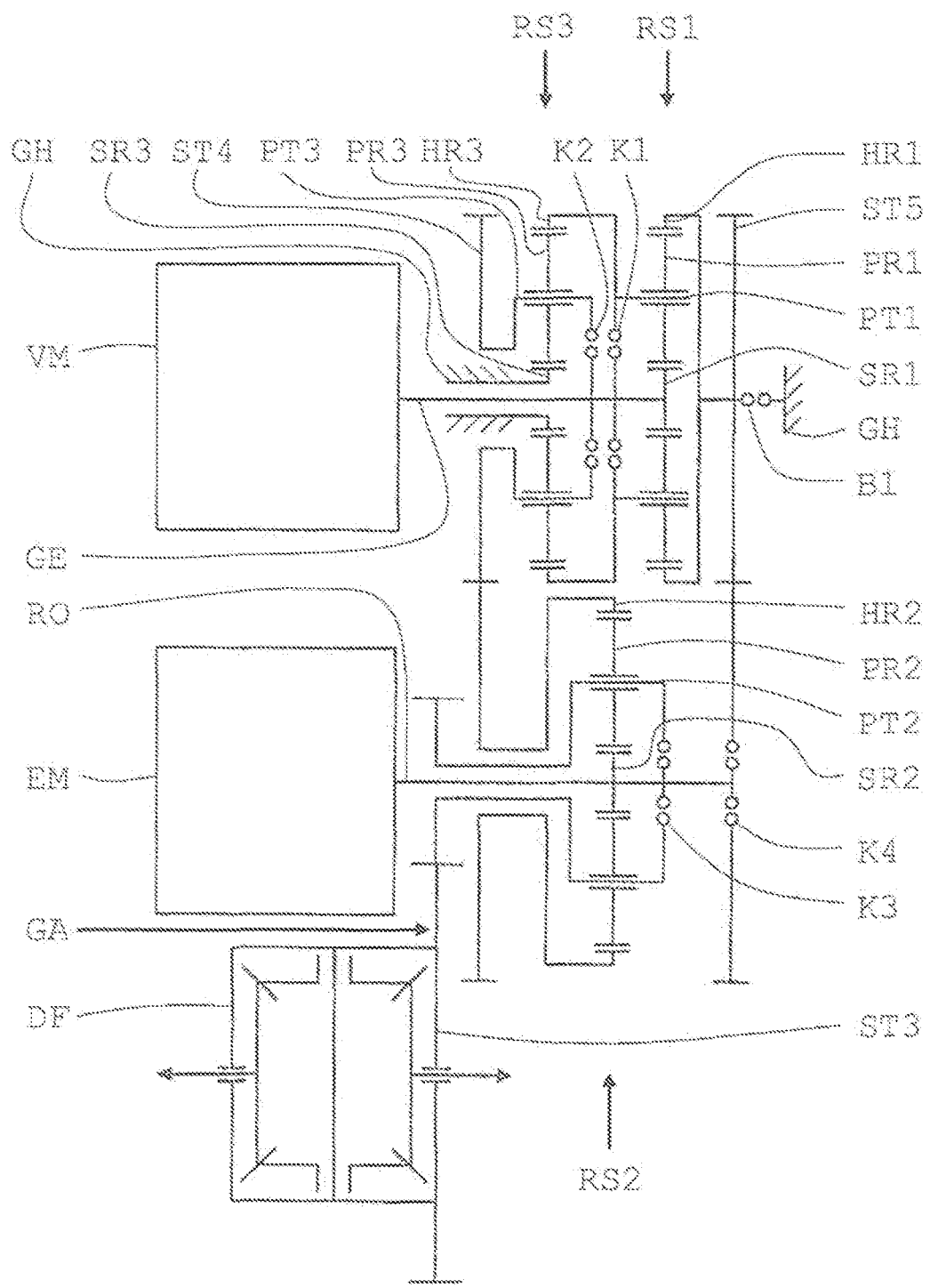
FIG. 7 is a second embodiment of a transmission scheme of a planetary transmission with three planetary gear sets, which operates in conjunction with an internal combustion engine and an electric motor.
Figure 8:
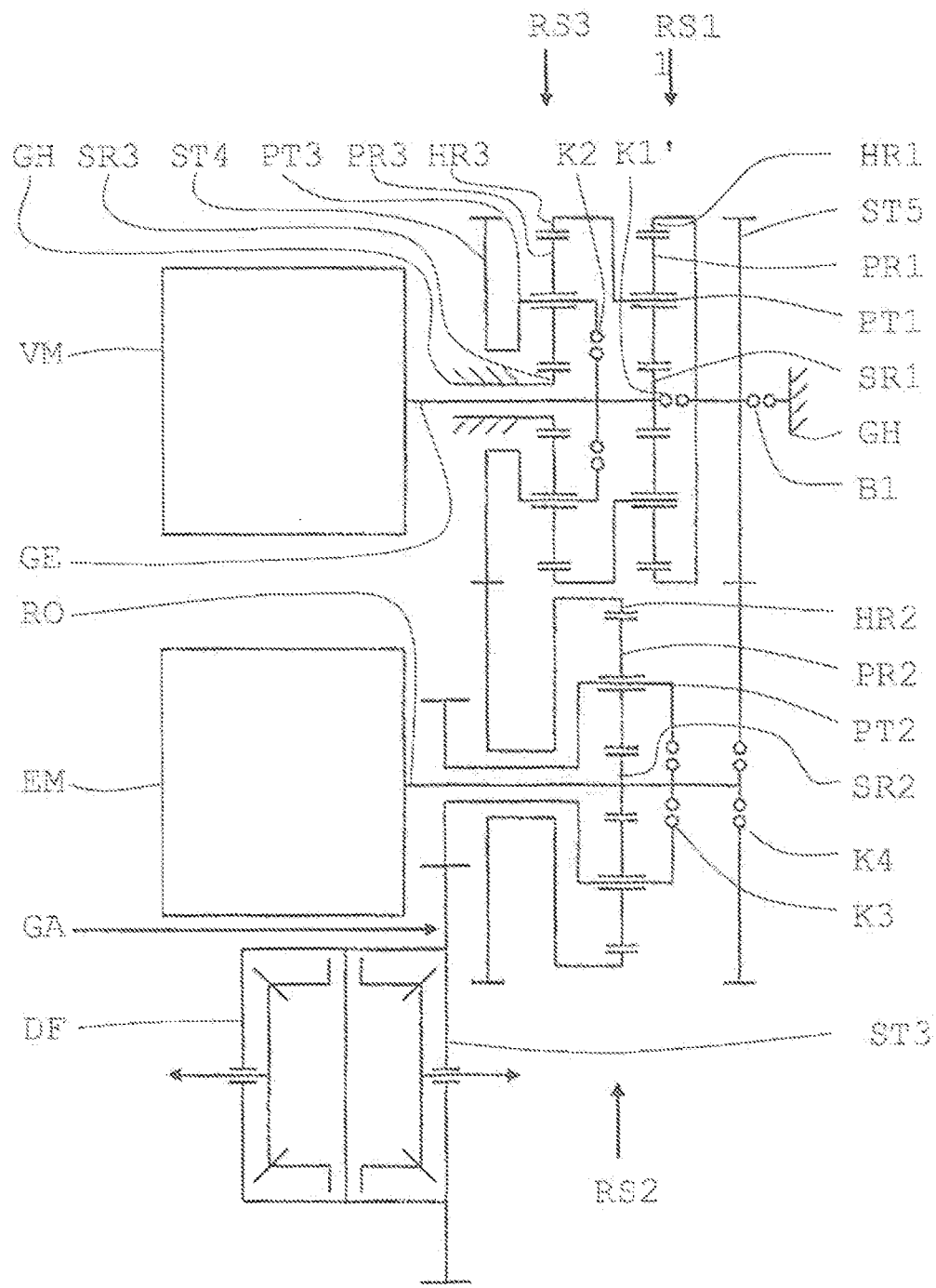
FIG. 8 is the transmission scheme of FIG. 7 with an alternative arrangement of the shifting elements for the blocking of a first planetary gear set.
Figure 9:
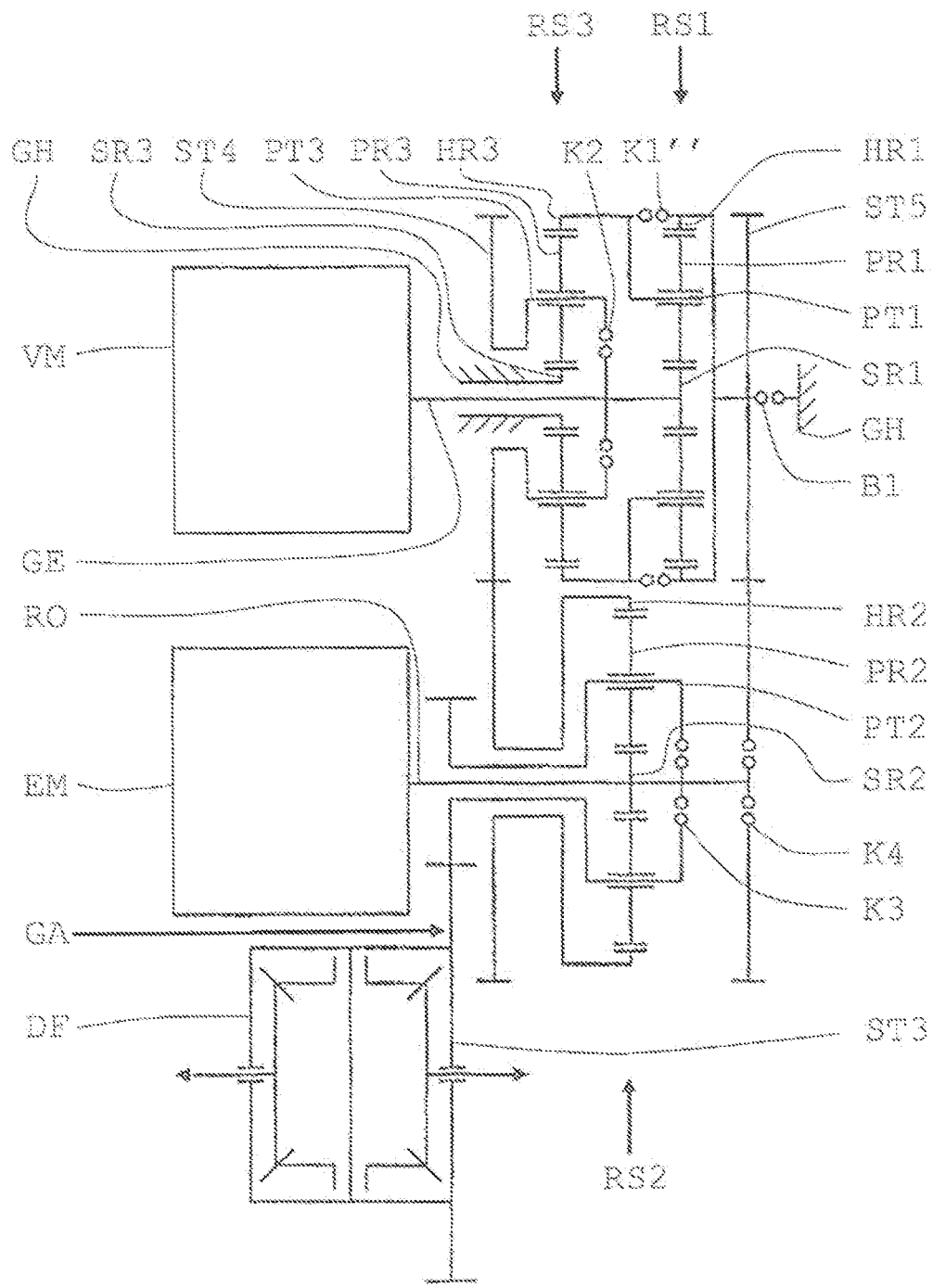
FIG. 9 is the transmission scheme of FIG. 7 with a different alternative arrangement of the shifting elements for the blocking of the first planetary gear set.
Figure 10:
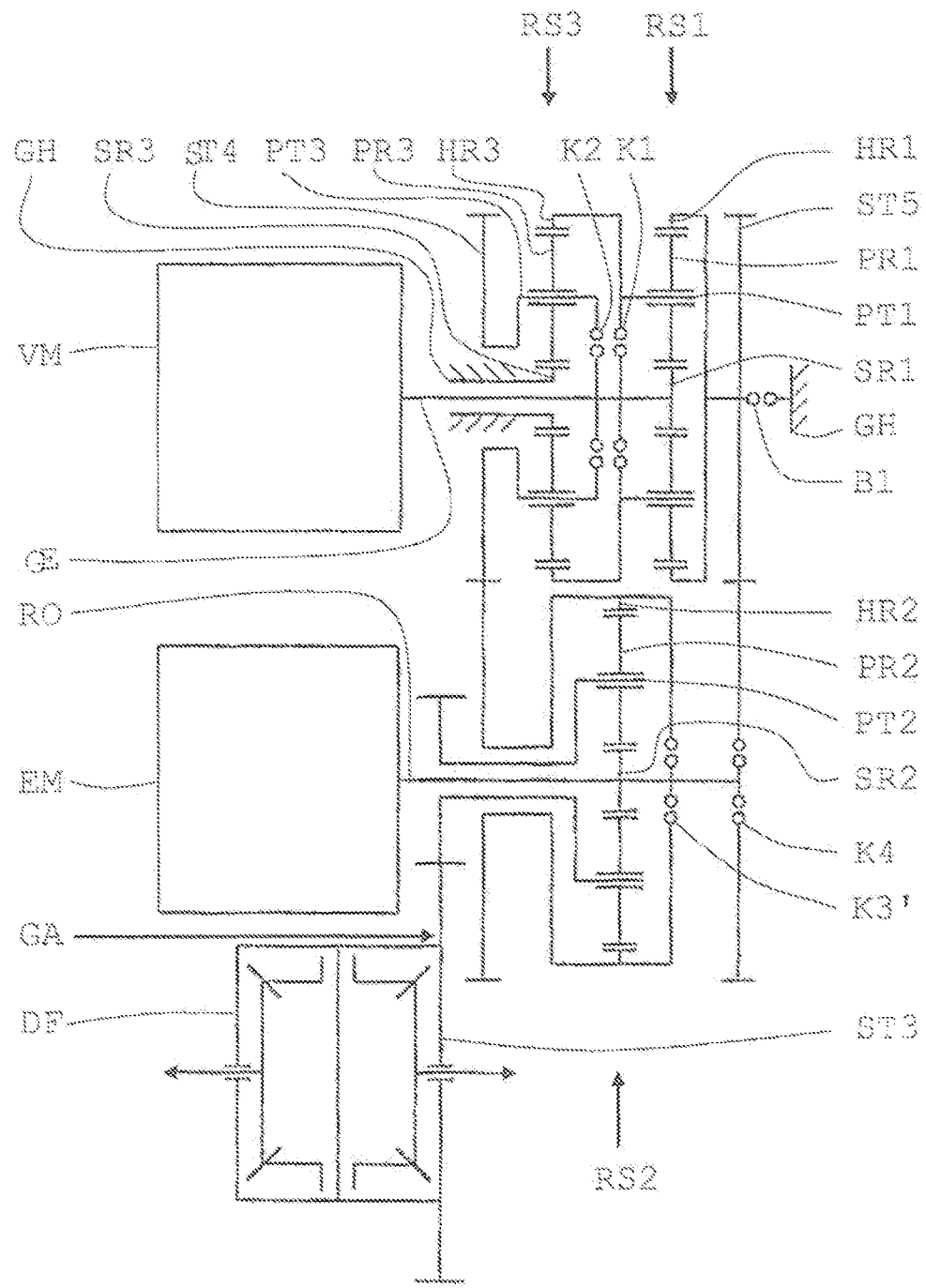
FIG. 10 is the transmission scheme of FIG. 7 with an alternative arrangement of the shifting elements for the blocking of a second planetary gear set.

FIG. 7 shows a different transmission structure of a planetary transmission with three planetary gear sets RS1, RS2, RS3, an internal combustion engine VM and an electric motor EM. The connections of the individual elements and the functions of this planetary transmission correspond to the planetary transmission shown in FIG. 1, and therefore are not described in more detail. However, a splitting of the gear sets RS1, RS2, RS3 to two axially parallel main shafts, a transmission input shaft GE or a drive shaft of the internal combustion engine VM, and a rotor shaft RO of the electric motor EM, is provided here.

The first two gear sets in RS1, RS2 are arranged coaxially to the internal combustion engine VM. For this purpose, the second gear set RS2 is arranged in an axially parallel manner. The electric motor EM is coaxially upstream to the second gear set RS2. For the transmission of power between the two main shafts GE, RO or the gear sets RS1, RS2 or RS3 arranged thereon, two spur gear stages are also provided; here, they are designated as fourth spur gear stage ST4 or fifth spur gear stage ST5. The fourth spur gear stage ST4 represents a drive connection between the planetary carrier PT3 of the third gear set RS3 and the ring gear HR2 of the second planetary gear set RS2. The fifth spur gear stage ST5 represents a shiftable drive connection between the ring gear HR1 of the first gear set RS1 and the sun gear SR2 of the second gear set RS2. The output of the planetary carrier PT2 of the second gear set RS2 at the differential transmission DF is provided through simple spur gear stage, which is designated here as the third spur gear stage ST3.

Moreover, with the transmission arrangement in accordance with FIG. 7, there are various options for the blocking of the first and second planetary gear sets RS1, RS2. FIGS. 8, 9, 10 and 11 show alternatives to each other for blocking, with the same effect, of the first and second planetary gear sets RS1, RS2 of the transmission arrangement of FIG. 7.

With the first planetary gear set RS1 of FIG. 7, its planetary carrier PT1 is connectable to its sun gear SR1 by means of the shifting clutch K1. With the first planetary gear set RS1 of FIG. 8, its ring gear HR1 can be coupled with the sun gear SR1 by means of a shifting clutch K1'. With the first planetary gear set RS1 of FIG. 9, its ring gear HR1 can be coupled with its planetary carrier PT1 by a shifting clutch K1".

Figure 11:
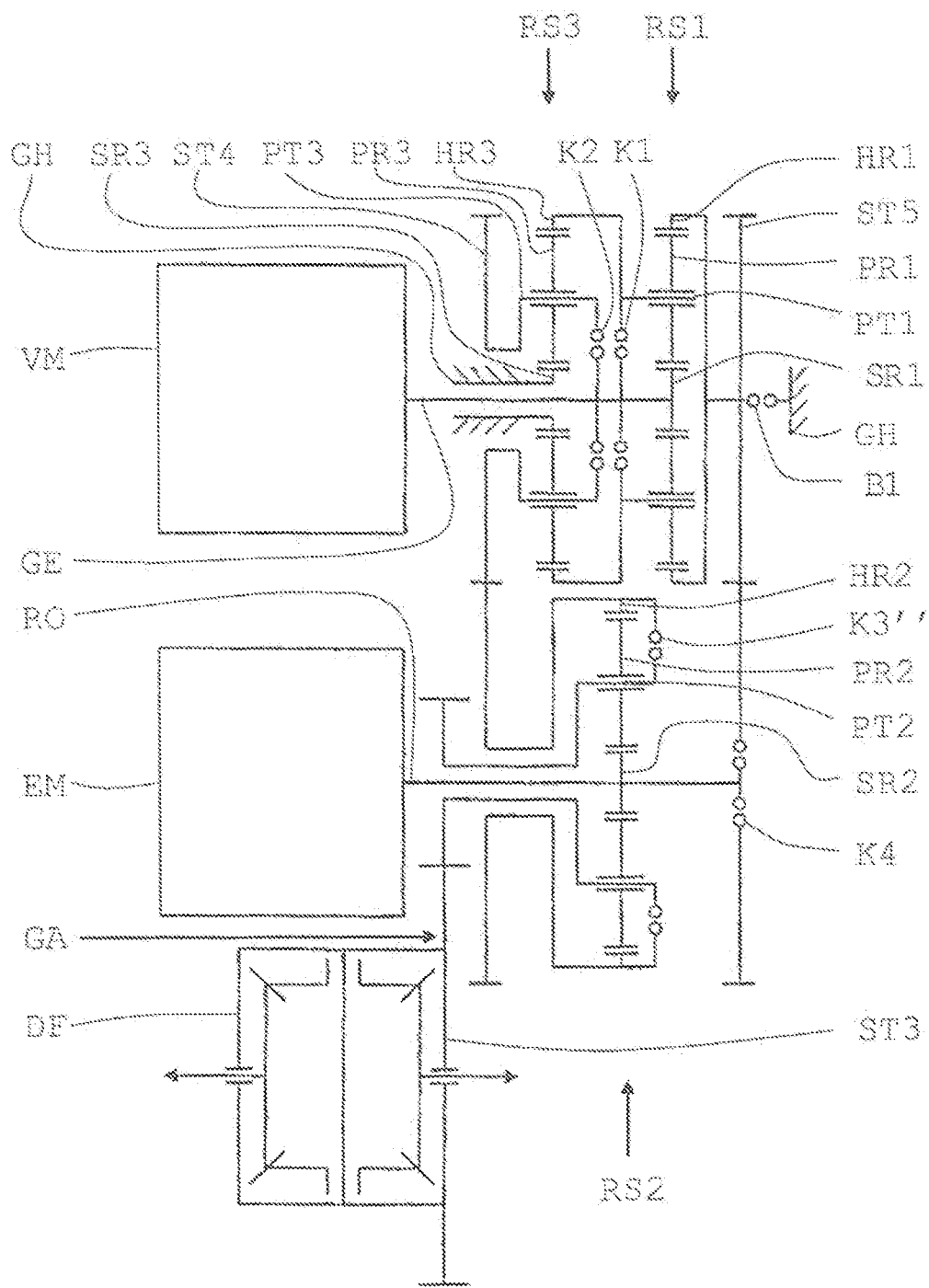
FIG. 11 is the transmission scheme of FIG. 7 with a different alternative arrangement of the shifting elements for the blocking of the second planetary gear set.

With the second planetary gear set RS2 of FIG. 7, its planetary carrier PT2 can be coupled with its sun gear SR2 by means of the shifting clutch K3. As an alternative to this, with the second planetary gear set RS2 of FIG. 10, its ring gear HR2 can be coupled with its sun gear SR2 through a shifting element K3'. FIG. 11 shows an additional alternative. Accordingly, a coupling of its ring gear HR2 with its planetary carrier PT2 is possible through a shifting clutch K3" of the second planetary gear set RS2.

Figure 12:
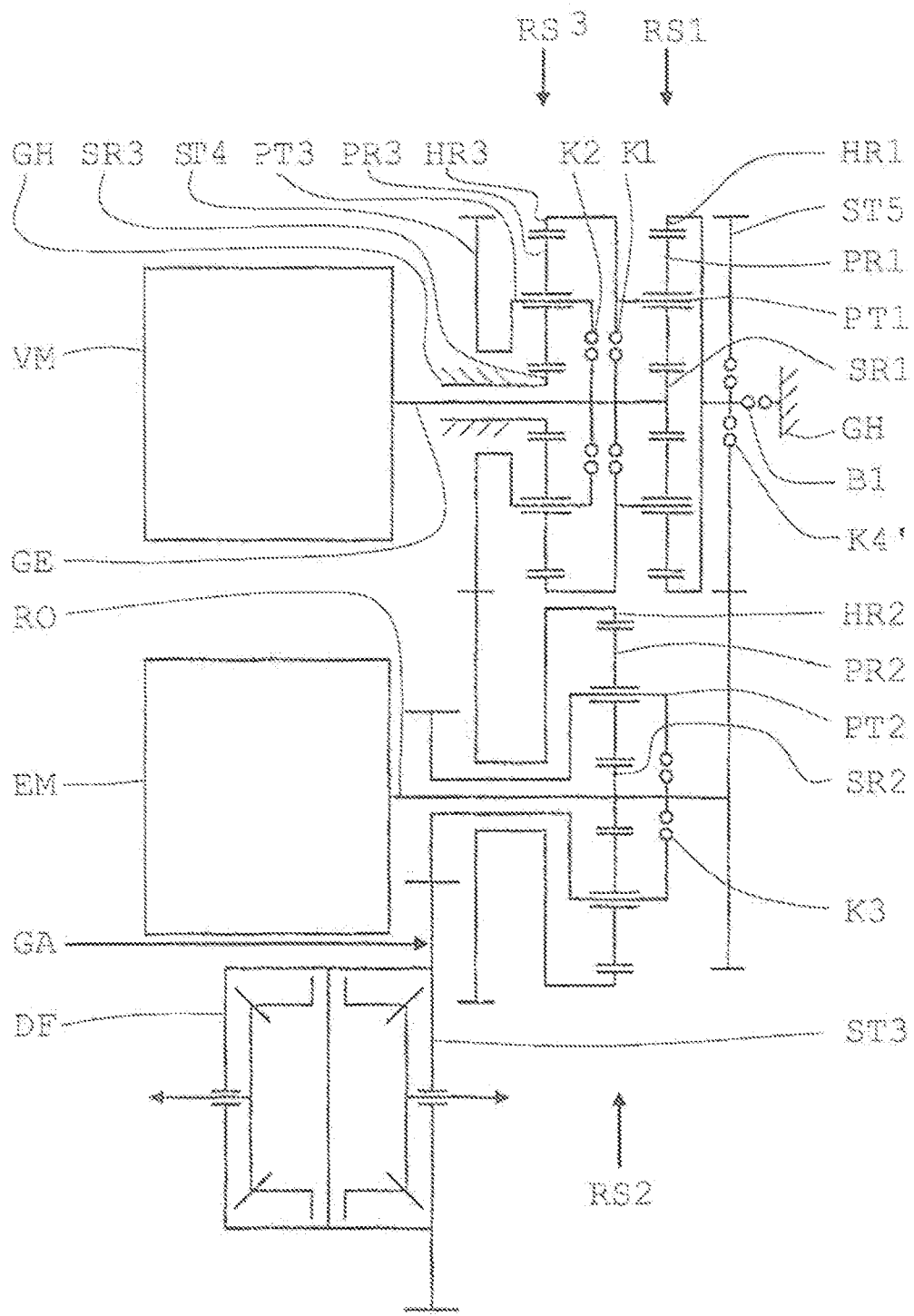
FIG. 12 is the transmission scheme of FIG. 7 with an alternative arrangement of the shifting elements for a pair of spur gears.

Since, for a pair of spur gears that is connectable to a shaft through a shifting element, which of the two spur gears is allocated to the shifting element is immaterial, the shifting element may be arranged accordingly upstream. This shows FIG. 12 as an example of the fourth shifting element K4 for the shifting of the transmission of power between the ring gear HR1 of the first planetary gear set RS1 and the sun gear SR2 of the second planetary gear set RS2, or the rotor shaft RO of electric motor EM regarding the relevant fifth pair of spur gears ST5. In comparison to the shiftable connection of FIG. 7 regarding the shifting clutch K4, a fourth shifting element K4' is arranged in a displaced manner at the side of the first gear set RS1, by means of which the relevant spur gear of the fifth pair of spur gears ST5 is connectable in a torque-proof manner to the ring gear HR1 of the first gear set RS1, or is detachable from this.

Modifications and variations can be made to the embodiments illustrated or described herein without departing from the scope and spirit of the invention as set forth in the appended claims.

The invention claimed is:

1. A planetary transmission for a hybrid drive of a motor vehicle having an internal combustion engine (VM) and an electric motor (EM), the transmission comprising;
first, second and third coupled planetary gear sets (RS1, RS2, RS3), each with a ring gear (HR1, HR2, HR3), a sun gear (SR1, SR2, SR3), and a planetary carrier (PT1, PT2, PT3) guiding several planets (PR1, PR2, PR3);
a plurality of shifting elements (B1, K1, K1', K1", K2, K3, K3, K3", K4, K4') for realization of several gears driven by one or both of the internal combustion engine or the electric motor (M1, M2, M3, M4, M5, M6, E1, E2);
for the first planetary gear set (RS1):
one of the two elements of ring gear (HR1) or planetary carrier (PT1) is connectable to a fixed-housing component (GH) and is connectable or connectable in drive terms to a rotor (RO) of the electric motor (EM);
the other of the two elements of ring gear (HR1) or planetary carrier (PT1) of the first planetary gear set (RS1) is connected to one of the two elements of ring gear (HR3) or planetary carrier (PT3) of a third planetary gear set (RS3);
the sun gear (SR1) of the first planetary gear set (RS1) is connected to a transmission input shaft (GE) and is connectable to one of the two elements of ring gear (HR3) or planetary carrier (PT3) of the third planetary gear set (RS3);
two of the elements of ring gear (HR1), planetary carrier (PT1), or sun gear (SR1) of the first planetary gear set (RS1) are connectable to each other;
for the second planetary gear set (RS2):
one of the two elements of ring gear (HR2) or planetary carrier (PT2) is connected or connectable in drive terms to one of the two elements of ring gear (HR3) or planetary carrier (PT3) of the third planetary gear set (RS3);
the other of the two elements of ring gear (HR2) or planetary carrier (PT2) of the second planetary gear set (RS2) is connected to a transmission output (GA);
the sun gear (SR2) of the second planetary gear set (RS2) is connected to the rotor (RO) of the electric motor (EM);
two of the elements of ring gear (HR2), planetary carrier (PT2), or sun gear (SR2) of the second planetary gear set (RS2) are connectable to each other; and
for the third planetary gear set (RS3):
its sun gear (SR3) is connected or connectable to the fixed-housing component (GH).

2. The planetary transmission according to claim 1, wherein:
for the first planetary gear set (RS1):
the ring gear (HR1) is connectable to the fixed-housing component (GH) and is connectable or connectable in drive terms to the rotor (RO) of the electric motor (EM);
the planetary carrier (PT1) is connected to the ring gear (HR3) of a third planetary gear set (RS3);
the sun gear (SR1) is connected to a transmission input shaft (GE) and is connectable to the planetary carrier (PT3) of the third planetary gear set (RS3);
two of the elements of ring gear (HR1), planetary carrier (PT1), or sun gear (SR1) of the first planetary gear set are connectable to each other;
for the second planetary gear set (RS2):
the ring gear (HR2) is connected or connected in drive terms to the planetary carrier (PT3) of the third planetary gear set (RS3);
the planetary carrier (PT2) is connected in drive terms to a transmission output (GA);
the sun gear (SR2) is connected to the rotor (RO) of the electric motor (EM);
two of the elements of ring gear (HR2), planetary carrier (PT2), or sun gear (SR2) of the second planetary gear set are connectable to each other;
for the third planetary gear set (RS3):
the sun gear (SR3) is connected or connectable to the fixed-housing component (GH).

3. The planetary transmission according to claim 1, wherein the internal combustion engine (VM), the electric motor (EM), and the three planetary gear sets (RS1, RS2, RS3) form a coaxial arrangement.

4. The planetary transmission according to claim 1, wherein:
the internal combustion engine (VM) and the electric motor (EM) are arranged in a manner axially parallel to each other;
the first planetary gear set (RS1) and the third planetary gear set (RS3) are arranged coaxial to the internal combustion engine (VM);
the second planetary gear set (RS2) is arranged coaxial to the electric motor (EM); and
a shiftable drive connection between one of the two elements of ring gear (HR1) or planetary carrier (PT1) of the first planetary gear set (RS1) and the electric motor (EM) is realized through one or more spur gear stages (ST5).

5. The planetary transmission according to claim 1, wherein the drive connection between one of the two elements of ring gear (HR2) or planetary carrier (PT2) of the second planetary gear set (RS2) and the transmission output (GA) is realized through one or more spur gear stages (ST1, ST2, ST3) or vehicle drives.

6. The planetary transmission according to claim 1, wherein for the realization of at least six shifting forward gears (M1, M2, M3, M4, M5, M6) without any interruption of the pulling force, the three planetary gear sets (RS1, RS2, RS3) are shifted by means of five unsynchronized shifting elements (B1, K1, K1', K1", K2, K3, K3', K3", K4, K4'), whereas four of the unsynchronized shifting elements are formed as positive-locking shifting clutches (K1, K1', K1", K2, K3, K3', K3", K4, K4') and one of the shifting elements is formed as a positive-locking shifting brake (B1).

7. The planetary transmission according to claim 1, wherein the planetary carrier (PT1) of the first planetary gear set (RS1) is connectable to the sun gear (SR1) of the first planetary gear set (RS1).

8. The planetary transmission according to claim 1, wherein the ring gear (HR1) of the first planetary gear set (RS1) is connectable to the sun gear (SR1) of the first planetary gear set (RS1).

9. The planetary transmission according to claim 1, wherein the ring gear (HR1) of the first planetary gear set (RS1) is connectable to the planetary carrier (PT1) of the first planetary gear set (RS1).

10. The planetary transmission according to claim 1, wherein a shifting element (K3, K3', K3") that is present for establishment of a connection between two of the elements of ring gear (HR2), planetary carrier (PT2), or sun gear (SR2) of the second planetary gear set (RS2) is formed as a frictional shifting element and also functions as a power-shifting element or a start-up element.

11. The planetary transmission according to claim 1, wherein the transmission is able to be brought into a shifting position for the charging of an electrical energy storage device with a stationary or rolling vehicle.

12. The planetary transmission according to claim 1, wherein the planetary carrier (PT2) of the second planetary gear set (RS2) is connectable to the sun gear (SR2) of the second planetary gear set (RS2).

13. The planetary transmission according to claim 1, wherein the ring gear (HR2) of the second planetary gear set (RS2) is connectable to the sun gear (SR2) of the second planetary gear set (RS2).

14. The planetary transmission according to claim 1, wherein the ring gear (HR2) of the second planetary gear set (RS2) is connectable to the planetary carrier (PT1, PT2) of the second planetary gear set (RS2).

* * * * *